United States Patent [19]
Aiki et al.

[11] Patent Number: 4,480,325
[45] Date of Patent: Oct. 30, 1984

[54] OPTICAL PICKUP

[75] Inventors: Kunio Aiki, Hachiouji; Masahiro Ojima, Kokubunji, both of Japan

[73] Assignee: Hitachi, Ltd., Tokyo, Japan

[21] Appl. No.: 472,220

[22] Filed: Mar. 4, 1983

Related U.S. Application Data

[63] Continuation of Ser. No. 169,794, Jul. 17, 1980, abandoned.

[30] Foreign Application Priority Data

Jul. 20, 1979 [JP] Japan .................. 54-99374

[51] Int. Cl.³ .............................. G11B 7/00
[52] U.S. Cl. ................... 369/122; 369/107; 372/43
[58] Field of Search ............ 369/44, 45, 106, 107, 369/120, 122, 116; 331/94.5 S, 94.5 H; 372/38, 43, 44, 75

[56] References Cited

U.S. PATENT DOCUMENTS

| 3,812,477 | 5/1974 | Wieder | 369/122 X |
| 3,941,945 | 3/1976 | Borner et al. | 369/120 X |
| 4,005,259 | 1/1977 | Kaneko | 369/122 X |
| 4,081,670 | 3/1978 | Albanese | 331/94.5 S |
| 4,322,839 | 3/1982 | Yamashita et al. | 369/122 |

FOREIGN PATENT DOCUMENTS 2244119  4/1974  Fed. Rep. of Germany ...... 369/122

OTHER PUBLICATIONS

Takeda et al., "Use of Heterostructure Diode Lasers in Video Disk Systems", Applied Optics, vol. 17, No. 6, Mar. 15, 1978, pp. 863-867.

Primary Examiner—Donald E. McElheny, Jr.
Attorney, Agent, or Firm—Antonelli, Terry & Wands

[57] ABSTRACT

An optical pickup wherein a semiconductor laser device for projecting a laser beam onto an optical disc is driven by a D.C. current and a high-frequency current superposed thereon, and the laser device oscillates in a multiple longitudinal mode.

21 Claims, 12 Drawing Figures

DISC DEVIATION FROM THE LIGHT FOCUS (μm)

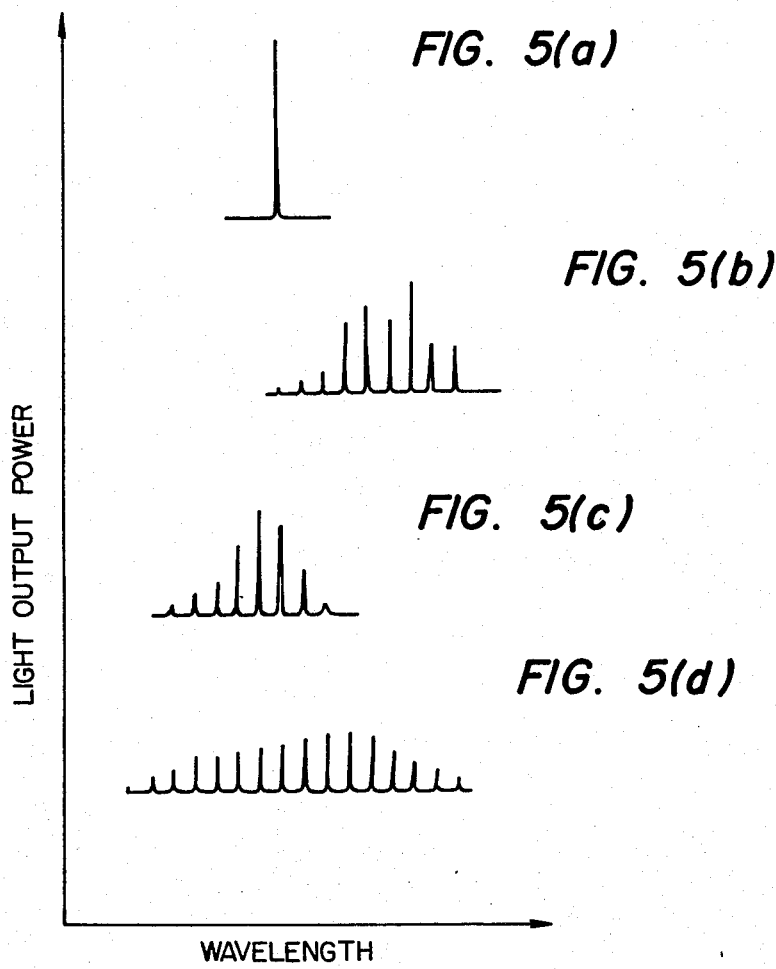

OPTICAL PICKUP

This is a continuation of application Ser. No. 169,794 filed July 17, 1980, abandoned.

BACKGROUND OF THE INVENTION

1. Field of the Invention

This invention relates to an optical pickup which is suitable for use in an information playback apparatus for optically reproducing information, and more particularly to an optical pickup which employs a semiconductor laser as a light source.

2. Description of the Prior Art

In an information playback apparatus which optically reproduces information from an optical video disc or an optical pulse-code-modulated audio disc, an optical pickup employing a semiconductor laser as a light source is used. As the optical pickups, there have heretofore been two types.

The first type is such that light reflected from the information storage medium is fed back to the semiconductor laser being the light source, whereupon a fluctuation in the output power of the semiconductor laser is detected by the photodetector. The optical pickup is the so-called SCOOP (Self-Coupled Optical Pickup).

FIG. 1 is a schematic constructional view of an information playback apparatus employing the SCOOP. Numeral 1 designates a semiconductor laser, and numeral 2 a disc having an information storage medium. By way of example, the medium is disposed on a circular substrate and records information in the form of pits or on the basis of reflection modulation. Numeral 3 indicates a photodetector, numeral 41 a lens for turning light from the semiconductor laser into a collimated beam, and numeral 42 a lens for condensing the laser beam into a spot diameter approximately equal to the wavelength of the light on the surface of the disc 2. This apparatus is characterized in that the disc 2 forms a part of an oscillator for the semiconductor laser. That is, the laser oscillation is caused by an optical resonator which is made up of three mirrors consisting of two facets of a semiconductor chip and the disc 2.

In this apparatus, the light output of the laser oscillation varies depending upon the amount of light fed back by reflection from the disc 2, and hence, information signals recorded on the disc are read out by detecting the variation. The feature of the apparatus is that a small number of constituent components suffice, which makes it possible to render the size small, the weight light and the cost low and which facilitates the adjustments of the optical system. On the other hand, as one of the disadvantages of this system, it is mentioned that the noise level of the signal is high.

The second type optical pickup is such that the reflected light from the optical disc is received by the photodetector directly without being fed back to the semiconductor laser. By way of example, the construction of this optical pickup will be described in connection with the apparatus shown in FIG. 1. A quarter-wave plate and a polarization prism are inserted between the semiconductor laser 1 and the disc 2 in order to prevent the reflected light from the optical disc 2 from being fed back to the semiconductor laser 1. The optical pickup in this case shall hereinbelow be termed the "conventional type optical pickup". It is not the situation in the conventional type optical pickup, either, that the reflected light from the disc is not fed back to the laser at all. In the pulse-code-modulated audio disc and the video disc, replicated discs are mass-produced by the use of synthetic resin. The replicated disc has a slight birefringence on account of a stress which arises during the replication. Accordingly, in case where information are reproduced from the replicated disc with the conventional type optical pickup, part of the reflected light from the disc is fed back to the semiconductor laser due to the birefringence of the replicated disc. Further, the reflected light from the disc is fed back to the semiconductor laser by such causes as slight misadjustment of the optical system including the quarter-wave plate and the polarization prism and deviations in the performance of the components. After all, also in case of the conventional type optical pickup, several % of the reflected light from the disc is fed back to the semiconductor laser and raises the noise level of the laser.

To sum up, the optical pickups employing the semiconductor lasers have the problem of the generation of noise of the semiconductor lasers ascribable to the feedback of the reflected light, whether they are the SCOOP or the conventional type optical pickup. The high noise level of the semiconductor laser incurs degradation in the sound quality in a pulse-code-modulated audio player and degradation in the picture quality in a video disc player.

SUMMARY OF THE INVENTION

An object of this invention is to provide, in an optical pickup device employing a semiconductor laser, an optical pickup which is free from the generation of noise.

In order to accomplish such object, this invention consists in that the semiconductor laser is oscillated in a multi-longitudinal mode.

BRIEF DESCRIPTION OF THE DRAWINGS

FIGS. 5(a)–5(d) are diagrams each showing a longitudinal-mode oscillation spectrum of a semiconductor laser.

DESCRIPTION OF THE PREFERRED EMBODIMENTS

Figure 1:
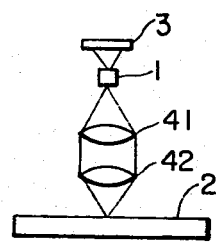
FIG. 1 is a constructional view of an optical pickup which employs a semiconductor laser of the reflected light feedback type.

Now, there will be explained noise which develop in an optical pickup employing a semiconductor laser as a light source. In case where, in the apparatus shown in FIG. 1, the disc 2 is not existent and accordingly the reflected light is not fed back to the semiconductor laser 1, the transverse-mode-controlled semiconductor laser oscillates in a single longitudinal mode when driven by D.C. current. The reason is that, since the semiconductor laser has a gain spectrum being substantially homogenious, the laser light energy concentrates on a certain longitudinal mode in which the gain exceeds the loss, during the steady oscillation based on the D.C. drive.

However, in case where the disc 2 is existent and the reflected light is fed back to the semiconductor laser, the drive of the semiconductor laser by the D.C. current results in the jump of an oscillated longitudinal mode to an adjacent longitudinal mode or the simultaneous oscillations of several longitudinal modes in attendance on minute movements of the disc. The cause for which the noise level of the semiconductor laser with the reflected-light feedback is high is such change of the oscillated longitudinal mode.

The change of the oscillated longitudinal mode is incurred in such a manner that the resonance mode of an external optical resonator formed by the facet of the semiconductor laser on the disc side and the disc surface competes with the resonance mode (longitudinal mode) of an optical resonator formed by the two facets of the semiconductor chip, and that the mode spectrum of the external resonator changes with the movement of the disc.

The single-longitudinal-mode oscillation and the multi-longitudinal-mode oscillation take place alternately each time the disc moves a half of the laser oscillation wavelength ($\lambda/2 \sim 0.4$ μm). This is because the resonance condition of the external resonator formed by the disc and the semiconductor laser facet becomes identical every $\lambda/2$ for the same wavelength.

The laser noise which develop at the feedback of the reflected light are classified into two sorts. The first noise is attributed to the fact that the single-longitudinal-mode oscillation and the multi-longitudinal-mode oscillation occur alternately in correspondence with the movement of the disc every $\lambda/2$. The output power during the single-longitudinal-mode oscillation is high, whereas the output power during the multi-longitudinal-mode oscillation is low. Accordingly, the laser output power changes every time the disc moves $\lambda/2$. The cause for which the output power differs depending upon whether the oscillated longitudinal mode is single or multiple is that the effective reflection coefficient in the case where the external resonator is regarded as one mirror is great during the single-longitudinal-mode oscillation and small during the multi-longitudinal-mode oscillation. The single-longitudinal-mode oscillation takes place in such a manner that the mode in which the effective reflection coefficient of the external resonator is maximized is selected. In the multi-longitudinal-mode oscillation, it is impossible to maximize the effective reflection coefficients of the external resonator for all of the several oscillating modes. On the average, therefore, they become smaller than the effective reflection coefficient during the single-longitudinal-mode oscillation. As the reflection coefficients of mirrors constituting the laser resonator are higher, the loss becomes less and the threshold current for oscillation becomes lower, and the output power is greater under a fixed current. Accordingly, the output power is greater during the single-longitudinal-mode oscillation. The frequency range of fluctuations in the output power dependent upon whether the oscillating longitudinal mode is single or multiple is determined by the rate at which the distance between the disc and the semiconductor laser changes $\lambda/2$, and it also depends upon the vertical movement and rotational frequency of the disc and the performance of an auto-focusing control. It is a low frequency range on the order of kHz—several tens kHz.

The second noise is a continuous spectrum noise extending over 0–2 GHz, and develops during the multi-longitudinal-mode oscillation. In the playback from the video disc, it degrades the signal-to-noise ratio of the video signal. Here, this second sort of noise shall be termed the "video-frequency noise". This noise does not develop during the single-longitudinal-mode oscillation even in the presence of the feedback of the reflected light. Only when the laser is oscillating in the multiple longitudinal mode due to the feedback of the reflected light, the video-frequency noise develops. In actuality, the single-longitudinal-mode oscillation and the multi-longitudinal-mode oscillation occur alternately whenever the disc moves $\lambda/2$, and hence, the video-frequency noise develops inevitably.

Now, the actuality of the development of the noise will be described in detail with reference to the drawings.

Figure 2:
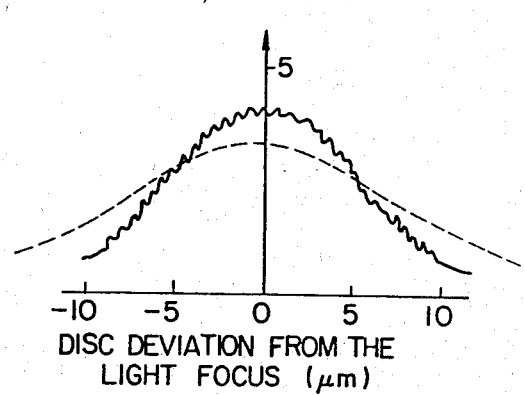
FIG. 2 is a diagram showing the relationship of the output power of a semiconductor laser to the deviation of a disc.

In case where the distance between the disc and the semiconductor laser changes with time, the fluctuations in the output power of the semiconductor laser attendant upon the change of the oscillating longitudinal modes degrade signal-to-noise ratios in the read-out signal of information, a servo control signal for a light spot, etc. For example, in case of the information playback from the disc, the vertical movement of the disc attendant upon the rotation thereof results in changing the distance between the disc and the semiconductor laser and giving rise to the fluctuations in the output power of the semiconductor laser. FIG. 2 is a diagram showing this situation.

Figure 3:
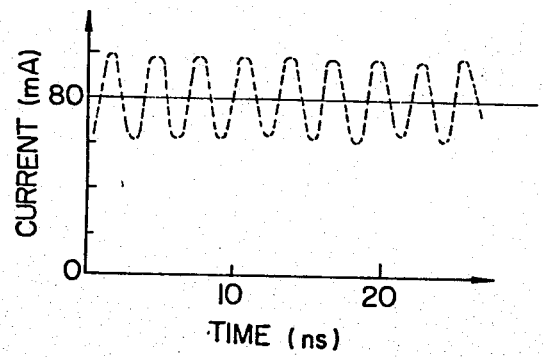
FIG. 3 is a diagram showing the time variation of a drive current for a semiconductor laser.

In FIG. 2, the axis of ordinates represents the output power (in mW) of the semiconductor laser, while the axis of abscissas represents the disc deviation (in μm) ascribable to the vertical movement of the disc. A solid line represents the variation of the output power in the case where the laser is driven by D.C. current. The drive by the D.C. current is performed along a solid line shown in FIG. 3. In FIG. 3, the axis of ordinates indicates the magnitude of current (in mA), while the axis of abscissas indicates the time (in ns).

Referring to FIG. 2, when the disc deviates ±10 μm from the focus position of the light spot, the semiconductor laser power decreases. This is attributed to the fact that, in the reflected light from the disc, the quantity of light which is fed back to a light emitting area on a laser facet decreases. On account of the minute deviations of the disc less than 1 μm, a small fluctuation in the output power occurs every $\lambda/2$ besides the large fluctuation described above. This is the first sort of low-frequency noise. This fluctuation of the output power amounts to (1/10)–(1/20) of the D.C. component of the output power. When the output power is low, the laser is oscillating in the multiple longitudinal mode, and the video-frequency noise increase at this time. The focus position of the light spot can be caused to follow up the disc deviation by the auto-focusing control of the light spot. However, it is difficult even with the automatic control technology to hold the disc and the focus position of the light spot constant at a precision within 1 μm, and it is difficult even by the auto-focusing control to eliminate the fluctuation of the output power attendant upon the change of the oscillating longitudinal modes.

Figure 4:
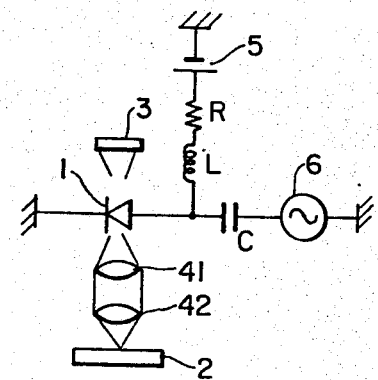
FIG. 4 is a diagram showing the construction of an embodiment of this invention.

This invention consists in suppressing the fluctuation of the output power attendant upon the change of the oscillating longitudinal modes by bestowing a characterizing feature on the driving method of the semiconductor laser. FIG. 4 shows the construction of an embodiment of this invention. Numerals 1, 2, 3, 41 and 42 in FIG. 4 indicate the same parts as in FIG. 1. The semiconductor laser is driven by currents which are supplied from the two current sources of a D.C. current source 5 and a high-frequency current source 6. Letters R, L and C in FIG. 4 designate a resistor, a coil and a capacitor, respectively. The components L and C are inserted in order to permit the two current sources to drive the semiconductor laser independently of each other. By driving the semiconductor laser with the high-frequency current, the fluctuations of the output power of the semiconductor laser due to the feedback of the reflected light can be suppressed. The drive of the semiconductor laser with the D.C. current and the high-frequency current is carried out in the form in which, as shown in FIG. 3, the high-frequency current (indicated by a dotted line) is superposed on the D.C. current (indicated by a solid line).

The operation and effect in the case of employing such drive of this invention will be described with reference to the drawings.

FIGS. 5(a)–5(d) show the longitudinal mode oscillation spectra of the semiconductor laser, in which the axis of ordinates indicates the light output power and the axis of abscissas the wavelength. In case where the laser is brought into the stationary oscillation by the D.C. current drive and where the reflected light is not fed back, the laser oscillates in the single longitudinal mode as illustrated in FIG. 5(a). In the presence of the feedback of the reflected light, when the spectrum is viewed on the time average during the movement of the disc, the laser is oscillating in the multiple longitudinal mode as illustrated in FIG. 5(b).

When the semiconductor laser is driven by the current with the D.C. component and the high-frequency current superposed as shown by the dotted line in FIG. 3, the oscillation spectrum is of the multi-longitudinal-mode oscillation as illustrated in FIG. 5(c). Important here is that the amplitude of the high-frequency current needs to be made great enough to turn the laser oscillation "on" and "off" with the high frequency. That is, the minimum value of the superposed current consisting of the D.C. component and the high-frequency component is made smaller than the threshold current for the oscillation. At the rise of the laser oscillation, a few longitudinal modes oscillate even in a semiconductor laser which has a homogenious spectral broadning. Accordingly, when the laser oscillation is turned "on" and "off" at the high frequency, the multi-longitudinal-mode oscillation state is held.

When the laser is oscillated in the multiple longitudinal mode by causing the high-frequency current to flow, the output power of the semiconductor laser varies gently versus the disc deviations as indicated by a dotted line in FIG. 2, and the fluctuations of the output power every $\lambda/2$ are suppressed. That is, the first sort of low-frequency noise induced by the alternate occurrence of the single longitudinal mode and the multiple longitudinal mode is fully suppressed. This is because the multi-longitudinal-mode oscillation state is always held by the high-frequency drive and the single-longitudinal-mode oscillation does not take place.

Further, the second sort of video-frequency noise is suppressed to a considerable extent owing to the high-frequency current drive. FIG. 5(d) shows an oscillation spectrum in the case where the high-frequency drive is performed in the presence of the feedback of the reflected light. There is no video-frequency noise in FIGS. 5(a) and 5(c), the video-frequency noise is great in FIG. 5(b), and the video-frequency noise is smaller in FIG. 5(d) than in FIG. 5(b).

Figure 6:
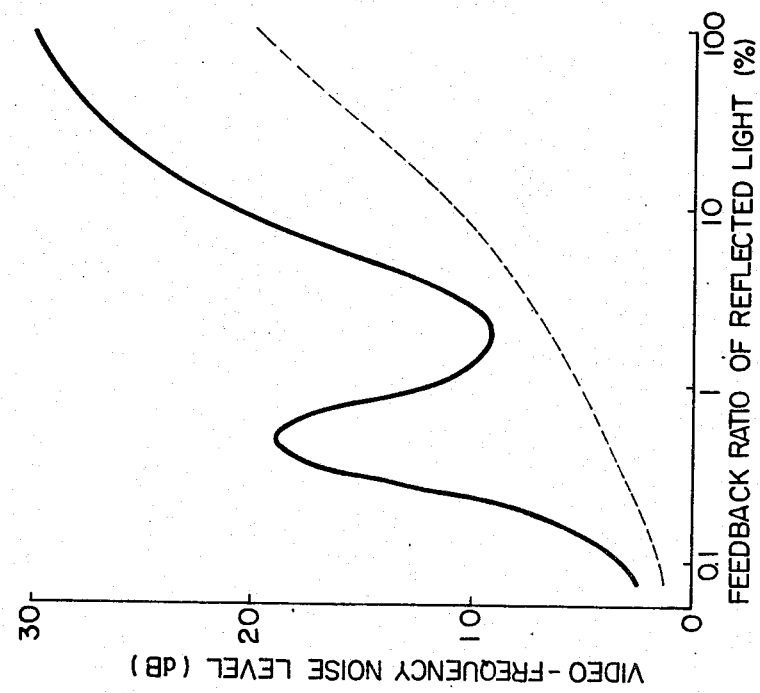

FIG. 6 is a characteristic curve diagram illustrating that the video-frequency noise level is suppressed by the high-frequency drive. The axis of ordinates indicates the video-frequency noise level, while the axis of abscissas indicates the feedback ratio of reflected light in logarithm. A laser which was used for obtaining the characteristic curve is a CSP (Channeled Substrate Planar) type semiconductor laser, which has an oscillation threshold current of 60 mA. In the figure, a case where this invention is applied is indicated by a solid line, and a case where this invention is applied (a case where the drive current is modulated by superposing a high-frequency component of 50 $mA_{p-p}$ at 120 MHz on a D.C. component of 75 MA) is indicated by a dotted line. When the feedback ratio of the reflected light is 100%, that is, when the optical pickup is the SCOOP, the video-frequency noise is suppressed about 10 dB. Even in case of the conventional type optical head, the feedback ratio of the reflected light inevitably amounts to several %. It is seen from FIG. 6 that, also in this case, the video-frequency noise can be suppressed by the high-frequency drive.

Figure 7:
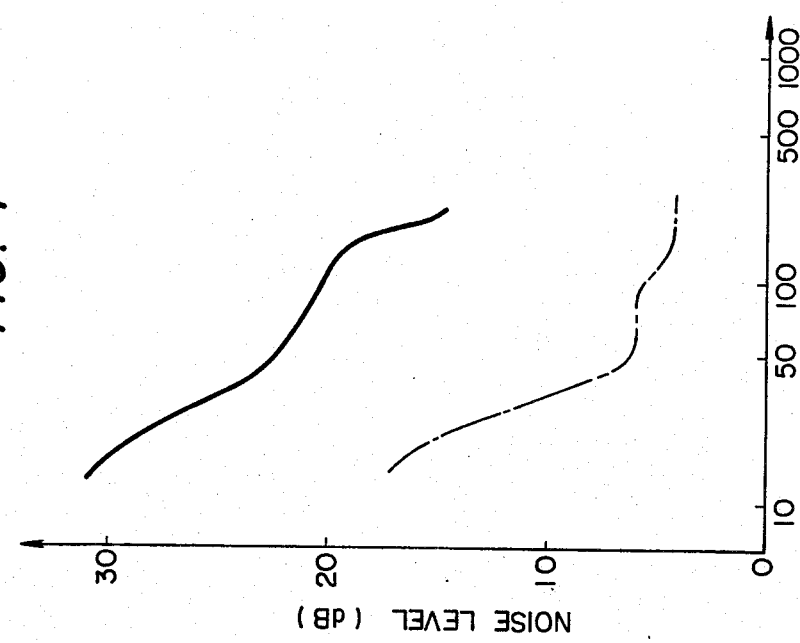
FIGS. 6, 7 and 8 are diagrams for explaining the fact that the video-frequency noise level is suppressed by the high-frequency drive.

FIG. 7 shows the suppression effect on the video-frequency noise versus the frequency used in the high-frequency drive. Characteristic curves were obtained in case where a CSP laser was operated under a D.C. current of 75 mA and a modulation current amplitude of 50 $mA_{p-p}$. It is seen from FIG. 7 that the noise suppression effect is remarkable at frequencies of and above 50 MHz. This is because the multi-longitudinal-mode oscillation occurs at or above 50 MHz. In FIG. 7, a solid line corresponds to a case where 100% of the reflected light is fed back, and a one-dot chain line corresponds to a case where 0.5% of the reflected light is fed back.

It is natural that the frequency of the high-frequency drive current needs to be a frequency which is sufficiently higher than the frequency of information intended to be played back from the disc. It is recommended to make the drive frequency at least 5 times, preferably at least 10 times, higher than the frequency of the playback information in consideration of the frequency characteristics of a photodetector. The frequency of the playback information is 1–10 MHz in cases of the video disc and the PCM audio disc. On the other hand, the semiconductor laser needs to be driven by the high-frequency current of or above 50 MHz in order to oscillate it in the multiple longitudinal mode. From the viewpoint of the practical use of an oscillator as well as a detector circuit for detecting light, high frequencies up to several hundred MHz are often employed. Thus, when the semiconductor laser is driven by the high-frequency current of or above 50 MHz, the output power fluctuations can be suppressed owing to the multi-longitudinal-mode oscillation, and besides, no inconvenient influence is exerted on the playback signal because the drive frequency is sufficiently higher than the frequency of the playback signal. More specifically, the frequency response characteristics of the photodetector and the detector circuit system extend up to a playback signal band, and they may be prevented from covering the high-frequency region of the semiconductor laser drive.

Figure 8:
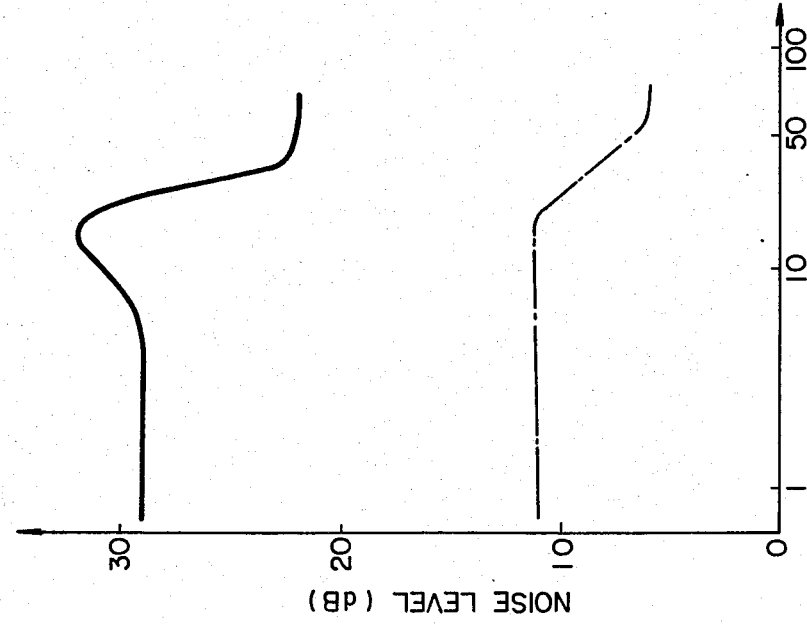

FIG. 8 shows the dependency of the noise suppression effect on the amplitude of the high-frequency current. Characteristic curves in FIG. 8 were obtained in such a way that a CSP laser was operated under an oscillation threshold current of 60 mA, a D.C. operating current of 75 mA and a modulation current frequency of 120 MHz. The noise suppressing effect appears for the first time when the laser oscillation turns "on" and "off" to establish the multiple longitudinal modes. As seen from FIG. 8, the noise suppressing effect is remarkable at or above:

$$(75 \text{ mA} - 60 \text{ mA}) \times 2 = 30 \text{ mA}_{p-p}$$

and this supports the foregoing fact.

In FIG. 8, a solid line corresponds to a case of a feedback ratio of 100%, and a one-dot chain line corresponds to a case of a feedback ratio of 2.7%.

Figure 9:
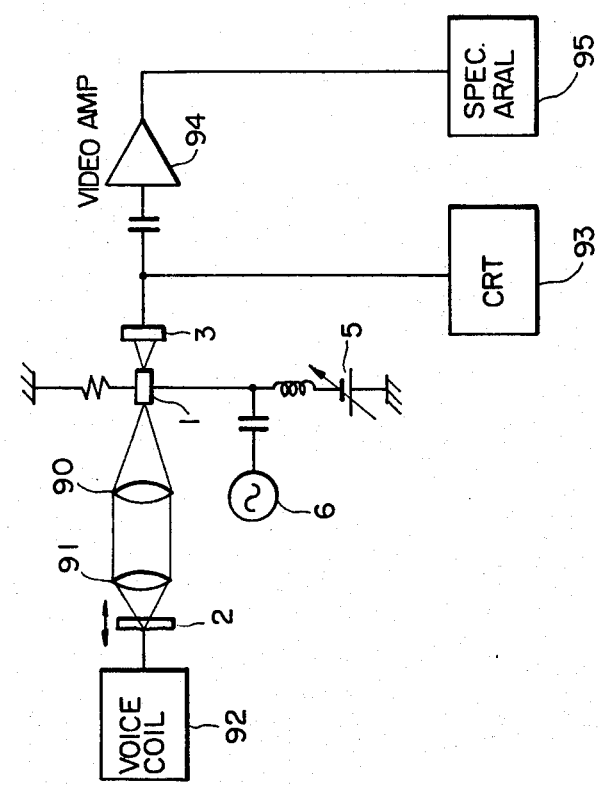
FIG. 9 is a diagram showing the construction of a measuring system which measures the noise of a semiconductor laser.

FIG. 9 is a diagram showing the construction of a measuring system which is used for investigating the development of noise of a semiconductor laser ascribable to the feedback of reflected light. Light emergent from the semiconductor laser 1 is turned into a collimated beam by a lens 90, and the beam is focused on a disc 2 by a condensing lens 91. The distance between the semiconductor laser 1 and the disc 2 is approximately 3 cm. The disc 2 can be vibrated in the direction of the focal depth of the light spot by a voice coil 92. As the laser power, a laser beam emitted onto the opposite side to the disc 2 is detected by a photodetector 3. An output from the photodetector 3 is displayed on a cathode-ray tube 93, and is subjected to a frequency analysis by a spectrum analyzer 95 after being amplified by a video amplifier 94. A laser drive current is a current obtained by superposing a D.C. component from a D.C. source 5 and an A.C. component from a high-frequency oscillator 6.

We claim:

1. An information reproducing system comprising a semiconductor laser device arranged to project a laser beam onto an optical disc containing information for reflection therefrom, means to oscillate said semiconductor laser device for driving said semiconductor laser device in a multiple longitudinal mode, optical means provided between said semiconductor laser device and the optical disc for deriving a beam of the reflection of the laser beam from the optical disc, and photoelectric conversion means responsive to the beam derived by said optical means for providing an output signal corresponding to the information contained on the optical disc.

2. An information reproducing system according to claim 1, wherein said semiconductor laser device is of the type which oscillates in a single longitudinal mode under a D.C. current drive.

3. An information reproducing system according to claim 1, wherein said optical means deflects the reflection of the laser beam from the optical disc away from the optical path between said semiconductor laser device and the optical disc onto said photoelectric conversion means.

4. An information reproducing system according to claim 3, wherein said optical means includes a quarter-wave plate and a polarization prism.

5. An information reproducing system according to claim 1, wherein said means to oscillate said semiconductor laser device includes means for supplying a D.C. current and a high-frequency current superposed thereon for driving said semiconductor laser device in the multiple longitudinal mode.

6. An information reproducing system according to claim 5, wherein the high-frequency current is a frequency at least five times the frequency of the information contained on the optical disc.

7. An information reproducing system according to claim 6, wherein the high-frequency current is a frequency of at least 50 MHz.

8. An information reproducing system comprising a semiconductor laser device arranged to project a laser beam onto an optical disc containing information and to receive a reflection therefrom, means to oscillate said semiconductor laser device in a multiple longitudinal mode, said means to oscillate including means to supply a D.C. current and a high-frequency current superposed thereon for driving said semiconductor laser device in the multiple longitudinal mode, and a photoelectric conversion device which derives an output of said laser device in accordance with the reflection from the optical disc and detects a variation thereof as an indication of the information on the optical disc.

9. An information reproducing system according to claim 8, wherein the high-frequency current is a frequency at least five times the frequency of the information contained on the optical disc.

10. An information reproducing system according to claim 9, wherein the high-frequency current is a frequency of at least 50 MHz.

11. An information reproducing system according to claim 8, wherein said semiconductor laser is of the type which oscillates in a single longitudinal mode under a D.C. current drive.

12. An information reproducing system for reproducing information stored on an optical disc comprising semiconductor laser means driven for projecting a laser beam onto the optical disc for reflection therefrom, photoelectric conversion means responsive to an output of said laser means for providing an output indicative of the information stored on the optical disc, and means for reducing noise generated in the information reproducing system, said noise reducing means including driving means for driving and oscillating said laser means in a multiple longitudinal mode.

13. An information reproducing system according to claim 12, wherein said driving means includes means for supplying a D.C. current and a high-frequency current superposed thereon for oscillating said laser means in a multiple longitudinal mode.

14. An information reproducing system according to claim 13, wherein the high-frequency current is a frequency of at least 50 MHz.

15. An information reproducing system according to claim 13, wherein the high-frequency current is a frequency at least five times the frequency of the information stored on the optical disc.

16. An information reproducing system according to claim 15, wherein the high-frequency current is a frequency of at least 50 MHz.

17. An information reproducing system according to claim 12, wherein said photoelectric conversion means is responsive to the reflection of the laser beam projected onto the optical disc for providing an output indicative of the information stored on the optical disc.

18. An information reproducing system according to claim 17, further comprising optical means provided between said semiconductor laser means and the optical disc for deriving a beam of the reflection of the laser beam projected onto the optical disc, said photoelectric conversion means being responsive to the beam derived by said optical means for providing an output indicative of the information stored on the optical disc.

19. An information reproducing system according to claim 18, wherein the high-frequency current is a frequency at least five times the frequency of the information stored on the optical disc.

20. An information reproducing system according to claim 19, wherein the high-frequency current is a frequency of at least 50 MHz.

21. An information reproducing system according to claim 12, wherein said semiconductor laser means oscillates in a single longitudinal mode under a D.C. current drive.

* * * * *